United States Patent [19]

Silvester et al.

[11] Patent Number: 5,695,677
[45] Date of Patent: Dec. 9, 1997

[54] IRONING AID

[75] Inventors: Raymond Neville Silvester; Frank Galluzzo, both of Castle Hill, Australia

[73] Assignee: R & C Products Pty Limited, Ermington, Australia

[21] Appl. No.: 674,421

[22] Filed: Jul. 2, 1996

[30]    Foreign Application Priority Data

Jul. 3, 1995  [AU]  Australia ............................ PN3962

[51] Int. Cl.$^6$ ............................................... D06M 23/06
[52] U.S. Cl. ..................................... 252/8.91; 252/8.61
[58] Field of Search ............................ 252/8.91, 8.61; 106/287.11

[56]            References Cited

U.S. PATENT DOCUMENTS 4,023,978  5/1977  Messina .................................. 106/213

FOREIGN PATENT DOCUMENTS

| 0177972.A2 | 4/1986 | European Pat. Off. . |
| 1-292184 | 11/1989 | Japan . |
| 1-292185 | 11/1989 | Japan . |
| 5-239774 | 2/1991 | Japan . |
| 2270930 | 3/1994 | United Kingdom . |
| 2302877 | 2/1997 | United Kingdom . |
| 91/19037 | 12/1991 | WIPO . |
| WO 94/01511 | 1/1994 | WIPO . |
| 95/06154 | 3/1995 | WIPO . |
| 96/15309 | 5/1996 | WIPO . |
| WO 96/15310 | 5/1996 | WIPO . |

OTHER PUBLICATIONS

Copy of PCT International Search Report for PCT/AU 96/00418.

Chemical Abstracts, vol. 112, Abstract No. 112:219282h which is an Abstract of Japanese Patent Specification No. 1–29285 (Nov. 1989).

Copy of GB Patent Office Search Report for GB Application No. 9613807.8 dated 2 Oct. 1996.

*Primary Examiner*—Anthony Green
*Attorney, Agent, or Firm*—Fish & Richardson P.C.

[57]            ABSTRACT

An aerosol ironing aid composition in the form of a stable emulsion including (a) 0.1 to 2.5% w/w of a non-polysaccharide, a non-cellulosic stiffening agent; (b) 0.4 to 3.0% w/w of an emulsified gliding agent; (c) 5 to 25% w/w of dimethylether as propellant; and (d) the balance being water.

9 Claims, No Drawings

IRONING AID

TECHNICAL FIELD

This invention relates to ironing aids, in particular aerosol compositions that are sprayed onto textiles and clothing prior to ironing, so as to provide for easier ironing through improved glide and to impart stiffening to the textiles and clothing, thereby reducing or eliminating wrinkles.

BACKGROUND OF THE INVENTION

Ironing aids in the form of compositions that are sprayed onto textiles using so-called trigger packs or aerosols prior to being ironed are well known and widely used. Apart from the requirement of a propellant, compositions for both trigger and aerosol formulations require the same essential components. These are a stiffening agent and a gliding agent. Typical stiffening agents comprise materials such as starch and sodium carboxymethyl cellulose (sodium CMC), whilst gliding agents typically used are silicone fluids. These agents may be present in a total concentration of about 0.3 to 6.0% w/w. Generally, ironing aids are in the form of oil-in-water emulsions as the silicone fluids are water-immiscible. In the case of aerosol compositions, the water immiscibility of the hydrocarbon propellants ensures the compositions are emulsions. Whilst ironing aid compositions are well known, such prior art compositions suffer from a number of limitations and disadvantages. These may be summarised as follows:

(1) Many compositions are not in the form of stable emulsions. For example, when sodium CMC is used as a stiffening agent with a silicone emulsion. This means that during filling of containers, continuous recycling of compositions is required, otherwise separation of the emulsion in the filling lines and header tank will occur, to ensure that each pack to be filled receives the correct composition. Furthermore, in the case of aerosol compositions hydrocarbon propellants, which are commonly used, "overload" the internal oil phase of the emulsion thereby causing separation. This will occur even though the concentrate may itself be stable. In use, such instability requires that a pack is vigorously shaken, prior to discharge of its contents, to reform the emulsion. Failure to do so causes composition to be discharged which is concentrated in silicone fluid and deficient in stiffening agent when the can is discharged at an acute angle. Alternatively, this may also occur when a can is low in content. In the case of a reasonably full can the effect of separation is that discharged composition will be deficient in silicone. The effect on ironed textiles and clothing is that the excess silicone will cause staining whilst the lack of stiffening agent will result in ineffective performance. Similarly a deficiency in silicone will adversely effect gliding performance.

(2) Incorporation of starch into a composition requires the starch to be cooked.

(3) Conventional formulations tend to cause clogging and brown film build-up on the iron and flaking on fabric, principally because of the presence of starch.

In recognition of these problems, the present inventors have sought to produce an aerosol composition which is a stable emulsion, whilst maintaining good stiffening performance and glide.

BRIEF SUMMARY OF THE INVENTION

Accordingly, the present invention consists in an aerosol ironing aid composition in the form of a stable emulsion comprising:

(a) a non-polysaccharide, non-cellulosic stiffening agent;
(b) an emulsified gliding agent;
(c) dimethylether as propellant; and
(d) the balance being water.

By "stable" it is meant that a composition will remain substantially without separation for at least a period sufficient to allow filling of the concentrate to occur, which is typically less than a week, preferably the fully formulated composition is stable for at least six months at about 25° C.

(a) Non-polysaccharide, non-cellulosic stiffening agent

A variety of stiffeners may be used excluding polysaccharide type stiffeners such as starch and cellulosic materials such as sodium carboxymethyl cellulose. The suitable stiffeners include polyvinylpyrrolidone/vinyl acetate (PVP/VA) copolymers, polyvinylpyrrolidone (PVP), anionic polymers such as Resyn 128-2930 (carboxylated vinyl acetate terpolymer) available from National Starch & Chemical Pty Ltd, acrylidones available from ISP; Eastman AQ polymers available from Swift Watts Winter Company; amphoteric polymers such as Amphomer (amphoteric acrylic interpolymer; octylacrylamide-acrylates-butylaminoethyl methacrylate copolymer) available from National Starch & Chemical Pty Ltd; acrylic polymers such as Diaformer (methylacryloyl ethyl betaine-acrylates copolymer) and Diahold (aminomethyl proponyl-acrylates copolymer) available from Clariant; and quaternized vinyl pyrrolidone/ dimethylaminoethyl methacrylate copolymers such as GAFQUAT 755 and 755N (neutralised) available from ISP. When materials such as Amphomer and Resyn 128-2930 are used, they should be neutralised with an alkali such as AMP Regular (2-amino-2 methyl-1 propanol). Eastman AQ polymers are dissolved by heating at 80° C.

Eastman AQ 38S and 55S polymers, for example, are anionic polymers compatible with a broad range of anionic and nonionic products. According to the manufacturer, they can be plasticised with glycerine, glycols, and phthalate plasticisers to different levels of flexibility. Eastman AQ polymers are relatively high molecular weight (14,000), amorphous polyesters which disperse in water without the assistance of organic co-solvents, surfactants, or amines. The water-dispersability of Eastman AQ polymers is attributed to the presence of sodiosulfo ($SO_3^-Na^+$) substituents in the general structure:

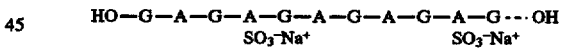
$$SO_3^-Na^+ \qquad SO_3^-Na^+$$

where

A=an aromatic dicarboxylic acid moiety
G=an aliphatic or cycloaliphatic glycol residue
—OH=hydroxy end groups Generally, the concentration of stiffener used will range from 0.1 to 2.5% w/w, preferably about 0.1 to 1.0% w/w. Although, when high molecular weight polyvinylpyrrolidones are used, the concentration should not exceed about 0.5% w/w.

Polysaccharides, particularly starch, are excluded as stiffening agents, as dimethylether causes such materials to come out of solution.

Similarly, cellulosic materials, particularly sodium CMC, are excluded as they cause separation of silicone fluid emulsions both in the concentrate and finished product.

(b) Emulsified gliding agent

The gliding agent must be emulsified and in the disperse phase. Preferably the gliding agent will be a silicone fluid.

Generally, the silicone fluid used will be relatively high in molecular weight to ensure stability under the high temperatures experienced during ironing. This is to ensure that the silicone fluid is not lost by volatility thereby prejudicing the glidant action. Preferably, the silicone fluid will be in the form of a ready-to-use emulsion, with the silicone having been formed using emulsion polymerisation. In the emulsion polymerisation process, either reactive siloxane monomers or low molecular weight reactive polysiloxanes of, for example, 50–150 centistokes viscosity, with terminal hydroxyl groups can be used. Examples of suitable silicone fluid emulsions include HV490 emulsion (silicone fluid emulsion prepared in 2% nonylphenoxy polyetheleneglycol and 3% triethylolamine dodecylbenzene sulphonate) available from Dow Corning, E22 emulsion available from Wacker-Chemie GmbH and LE-467 emulsion (Y-12623 emulsion) available from Union Carbide. For most compositions, a suitable concentration of silicone fluid in the form of an emulsion will be about 0.4 to 3.0% w/w; generally about 2% w/w, with the silicone fluid being about 35% w/w in the emulsion.

(c) Dimethylether propellant

To ensure stability of the compositions of the invention, it is essential to use dimethylether (DME) as a propellant. The concentration of dimethylether used will depend upon a number of factors, but for guidance, about 5 to 25% w/w may be used, preferably about 8 to 15% w/w.

By using DME, the present inventors found that because of its miscibility with water, no "overloading" of the internal emulsified gliding agent phase occurred. This is clearly advantageous over hydrocarbon propellants.

A number of other materials may be incorporated into the compositions of the invention as required. These include preservatives, e.g. 1,2 -dibromo-2,4-dicyanobutane (available as Tektamer 38 AD) corrosion inhibitors, perfumes and the like. Borax may be used and has been found to improve the dissolution of the perfume component in the compositions of the invention. Phenoxyethanol may be included and has been observed to aid and enhance the preservative effect of 1,2-dibromo-2,4-dicyanobutane. The person skilled in the art would readily appreciate further materials that may be incorporated and, without undue experimentation, would be able to determine suitable concentrations.

It may, however, be mentioned that amongst the corrosion inhibitor systems that have been examined, AMP regular/ sodium benzoate, AMP regular/sodium lauroyl sarcosinate and AMP regular/REWOCOROS B3010 are suitable (REWOCOROS B3010 (di- sodium salt of alkenylsuccinic acid) is available from Amcor Trading— manufactured by REWO Chemicals Ltd). Particularly preferred are the two latter systems.

To determine the stiffness of textiles or clothing treated with the ironing aid compositions of the invention, a Shirley Stiffness Tester Serial No 202 may be used. Such a test is conducted using previously washed 65/35 polyester cotton cloth strips 2.6 cm×15.4 cm cut along the warp direction. About 0.7 g of product concentrate is applied by totally wetting the strip and then ironed dry using an appropriate setting.

Measurements are taken after the polyester cotton cloth strip is cooled. Generally, compositions of the invention yield stiffness results (bending length) of >2 CMS, preferably >2.5 CMS Shirley Stiffness Tester scale units. These stiffness results are comparable with existing satisfactory compositions.

Similarly, subjective comparative tests of gliding indicate that the compositions of the invention are comparable to prior art compositions.

From the foregoing it will be evident that the present invention offers substantial advantages over the prior art. Firstly by providing a stable composition, the correct concentrations of gliding agent and stiffening agent will be provided to textiles and clothing to be ironed. Secondly, by avoiding the inclusion of starch, clogging of and brown film build-up on an iron and flaking on fabric are largely avoided. Furthermore, with compositions based on starch, it has been observed that fabrics so-treated are subject to increased soiling and staining and also increased tendency to scorching on ironed fabric. Exclusion of starch largely avoids these problems. Thirdly, the use of dimethylether in a stable emulsion circumvents the need to agitate a can which is usually required when hydrocarbon propellants are used. A consequence of the use of dimethylether is that premature loss of propellant in misuse situations will be substantially reduced.

DETAILED DESCRIPTION OF THE INVENTION

In order to better understand the nature of the invention, a number of examples will now be described. The procedure used to form each composition was essentially the same, as follows:

Dissolve water soluble ingredients, including stiffener (with neutralisation or heating as required) in about 30% of the water. Vigorously stir in silicone fluid emulsion and perfume until a homogenous emulsion is formed. Make up to volume with the balance of the water. Add appropriate amount of Dimethylether when filling into suitable aerosol container.

|  | A % w/w | B % w/w |
|---|---|---|
| PVP/VA S-630 (1) | 0.5 | 0.5 |
| HV-490 Emulsion (2) | 2.0 | — |
| E22 Emulsion (3) | — | 2.0 |
| Borax | 0.2 | 0.2 |
| Amp Regular (7) | 0.1 | 0.1 |
| Sodium Benzoate | 0.5 | 0.5 |
| Tektamer 38 AD (8) | 0.08 | 0.08 |
| Phenoxyethanol | 0.1 | 0.1 |
| Perfume | 0.1 | 0.1 |
| Deionised Water | 88.42 | 88.42 |
| Dimethylether Propellant (4) | 8.0 | 8.0 |
| Total | 100.00 | 100.00 |
| Stiffness - bending length (CMS) | 3.12 | 2.55 |

|  | C % w/w | D % w/w | E % w/w |
|---|---|---|---|
| AMPHOMER (5) | 0.5 | — | — |
| RESYN 128-2930 (5) | — | 0.5 | — |
| AMPHOMER LV-71 (5) | — | — | 0.5 |
| HV-490 Emulsion (2) | 2.0 | 2.0 | 2.0 |
| Borax | 0.2 | 0.2 | 0.2 |
| Amp Regular (7) | 0.35 | 0.45 | 0.25 |
| Sodium Benzoate | 0.5 | 0.5 | 0.5 |
| Tektamer 38 AD (8) | 0.08 | 0.08 | 0.08 |
| Phenoxyethanol | 0.1 | 0.1 | 0.1 |
| Perfume | 0.1 | 0.1 | 0.1 |
| Deionised Water | 88.17 | 88.07 | 88.27 |
| Dimethylether Propellant (4) | 8.0 | 8.0 | 8.0 |
| Total | 100.00 | 100.00 | 100.00 |
| Stiffness - bending length (CMS) | 2.74 | 2.87 | N/A |

|  | F % w/w | G % w/w |
|---|---|---|

|  | continued |  |
|---|---|---|
| Eastman AQ 55S polymer (6) | 0.5 | — |
| Eastman AQ 38S polymer (6) | — | 0.5 |
| HV-490 Emulsion (2) | 2.0 | 2.0 |
| Borax | 0.2 | 0.2 |
| Amp Regular (7) | 0.1 | 0.1 |
| Sodium Benzoate | 0.5 | 0.5 |
| Tektamer 38 AD (8) | 0.08 | 0.08 |
| Phenoxyethanol | 0.1 | 0.1 |
| Perfume | 0.1 | 0.1 |
| Deionised Water | 88.42 | 88.42 |
| Dimethylether Propellant (4) | 8.0 | 8.0 |
| Total | 100.00 | 100.00 |
| Stiffness - bending length (CMS) | 2.67 | 2.65 |

|  | H % w/w | I % w/w |
|---|---|---|
| PVP/VA E-635 (1) | 1.0 | — |
| PVP/VA E-735 (1) | — | 1.0 |
| HV-490 Emulsion (2) | 2.0 | 2.0 |
| Borax | 0.2 | 0.2 |
| Amp Regular (7) | 0.1 | 0.1 |
| Sodium Benzoate | 0.5 | 0.5 |
| Tektamer 38 AD (8) | 0.08 | 0.08 |
| Phenoxyethanol | 0.1 | 0.1 |
| Perfume | 0.1 | 0.1 |
| Deionised Water | 87.92 | 87.92 |
| Dimethylether Propellant (4) | 8.0 | 8.0 |
| Total | 100.00 | 100.00 |
| Stiffness - bending length (CMS) | 3.0 | 3.02 |

|  | J % w/w |
|---|---|
| PVP K90 (1) | 0.46 |
| HV-490 Emulsion (2) | 2.0 |
| Borax | 0.2 |
| Amp Regular (7) | 0.1 |
| Sodium Benzoate | 0.5 |
| Tektamer 38 AD (8) | 0.08 |
| Phenoxyethanol | 0.1 |
| Perfume | 0.1 |
| Deionised Water | 88.46 |
| Dimethylether Propellant (4) | 8.0 |
| Total | 100.00 |
| Stiffness - bending length (CMS) | 2.15 |

|  | K % w/w | L % w/w |
|---|---|---|
| Gafquat 755 (20% active) (1) | 0.7 | — |
| Gafquat 755N (20% active) (1) | — | 0.82 |
| HV-490 (2) | 2.0 | 2.0 |
| Borax | 0.2 | 0.2 |
| Amp Regular (7) | 0.1 | 0.1 |
| Sodium Benzoate | 0.5 | 0.5 |
| Tektamer 38 AD (8) | 0.08 | 0.08 |
| Phenoxyethanol | 0.1 | 0.1 |
| Perfume | 0.1 | 0.1 |
| Deionised Water | 88.2 | 88.1 |
| Dimethylether Propellant (4) | 8.0 | 8.0 |
| Total | 100.00 | 100.00 |
| Stiffness - bending length (CMS) | 2.74 | 2.49 |

(1) Available from ISP (Australasia) Pty Ltd
(2) Available from Dow Corning
(3) Available from Wacker-Chemie GmbH
(4) Available from CSR Ltd, Distillery Division
(5) Available from National Starch & Chemical Pty Ltd (registered trade mark)
(6),(8) Available from Swift Watts Winter Company
(7) Available from International Sales & Marketing Pty Ltd (Angus Chemical Company).

For the purposes of comparison, a control (no ironing aid) gave a stiffness—bending length of 1.75 CMS.

When filled into suitable aerosol containers, the compositions of this invention give spray rates comparable with the prior art with an acceptable break-up. At 25° C. a spray rate of 2 g/sec is typically achieved. It is, however, necessary to carefully choose the valve system to achieve an appropriate spray rate and break-up. One such system is available from Precision Valve Australia Pty Ltd under the specification SSS-8305.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. An aerosol ironing aid composition in the form of a stable emulsion comprising:

(a) 0.1 to 2.5% w/w of a non-polysaccharide, non-cellulosic stiffening agent selected from the group consisting of: polyvinylpyrrolidone/vinyl acetate copolymers; polyvinylpyrrolidone; anionic polymers; acrylidones; amphoteric polymers; acrylic polymers; quaternized vinyl pyrrolidone/dimethylaminoethyl methacrylate copolymers; and mixtures thereof, (b) 0.4 to 3.0% w/w of an emulsified gliding agent;

(c) 5 to 25% w/w of dimethylether as propellant; and (d) the balance being water.

2. The aerosol ironing aid composition according to claim 1 wherein the non-polysaccharide, non-cellulosic stiffening agent is present in concentration of from about 0.1 to 1.0% w/w.

3. The aerosol ironing aid according to claim 1 wherein the emulsified gliding agent is present in a concentration of about 2.0% w/w.

4. The aerosol ironing aid composition according to claim 1 wherein the emulsified gliding agent is a silicone fluid.

5. The aerosol ironing aid composition according to claim 4 wherein the silicone fluid is in the form of a ready-to-use silicone fluid emulsion.

6. The aerosol ironing aid composition according to claim 5 wherein the silicone fluid emulsion in the composition is present in a concentration of about 2% w/w, with the silicone fluid being about 35% w/w in the emulsion.

7. The aerosol ironing aid composition according to claim 1 wherein the dimethylether propellant is present in a concentration of from about 8 to 15% w/w.

8. The aerosol ironing aid composition according to claim 1 further including preservatives, corrosion inhibitors, and/or perfumes.

9. A method of ironing a textile or article of clothing comprising applying to the textile or article of clothing to be ironed an aerosol ironing aid composition according to claim 1.

* * * * *